US007627147B2

(12) United States Patent
LoIacono et al.

(10) Patent No.: US 7,627,147 B2
(45) Date of Patent: Dec. 1, 2009

(54) METHOD AND APPARATUS FOR OBTAINING IRIS BIOMETRIC INFORMATION FROM A MOVING SUBJECT

(75) Inventors: Dominick LoIacono, Yardville, NJ (US); James R. Matey, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 93 days.

(21) Appl. No.: 11/377,042

(22) Filed: Mar. 16, 2006

(65) Prior Publication Data

US 2006/0274919 A1 Dec. 7, 2006

Related U.S. Application Data

(60) Provisional application No. 60/687,106, filed on Jun. 3, 2005.

(51) Int. Cl.
*G06K 9/00* (2006.01)
(52) U.S. Cl. ........................................ 382/117; 382/115
(58) Field of Classification Search .......... 382/115–123
See application file for complete search history.

(56) References Cited

U.S. PATENT DOCUMENTS

| 5,291,560 | A | 3/1994 | Daugman |
| 7,118,042 | B2* | 10/2006 | Moore et al. ........... 235/462.48 |
| 2003/0169334 | A1 | 9/2003 | Braithwaite et al. |
| 2005/0084179 | A1 | 4/2005 | Hanna et al. |
| 2006/0140454 | A1* | 6/2006 | Northcott et al. ............ 382/117 |

* cited by examiner

*Primary Examiner*—Wesley Tucker
(74) *Attorney, Agent, or Firm*—Lowenstein Sandler, PC

(57) ABSTRACT

A method and apparatus for obtaining iris biometric information that provides increased standoff distance and capture volume is provided herein. In one embodiment, a system for obtaining iris biometric information includes an array of cameras defining an image capture volume for capturing an image of an iris; and an image processor, coupled to the array of cameras, for determining at least one suitable iris image for processing from the images generated for the image capture volume. The image capture volume may include a plurality of cells, wherein each cell corresponds to at least one of the cameras in the array of iris image capture cameras.

17 Claims, 2 Drawing Sheets

METHOD AND APPARATUS FOR OBTAINING IRIS BIOMETRIC INFORMATION FROM A MOVING SUBJECT

CROSS-REFERENCE TO RELATED APPLICATIONS

This application claims the benefit of U.S. Provisional Application No. 60/687,106 filed on Jun. 3, 2005, which is incorporated herein by reference. In addition, this application is related to co-pending U.S. application Ser. No. 11/334,968, filed on Jan. 19, 2006, and entitled "Method and Apparatus for Providing Strobed Video Capture," by Lolacono, et al., and co-pending U.S. application Ser. No. 11/364,300, filed on Feb. 28, 2006, and titled "Method and Apparatus for Designing Iris Biometric Systems for Use in Minimally Constrained Settings," by Amantea, et al., both of which are incorporated herein by reference.

GOVERNMENT RIGHTS IN THIS INVENTION

This invention was made with U.S. government support under contract number NMA401-02-9-2001-0041. The U.S. government has certain rights in this invention.

BACKGROUND OF THE INVENTION

1. Field of the Invention

The invention relates generally to biometric techniques. More specifically, the invention relates to iris-based biometric techniques.

2. Description of the Related Art

Iris-based biometric techniques are useful for recognition, verification, or tracking of individuals. Iris-based biometric methods can provide high accuracy identification and other functions with relatively low system cost. Because of the availability of very efficient indexing techniques, iris-based biometrics can also be used when a large number of people must be screened and rapidly matched to a database of millions of individuals.

However, the widespread use of iris-based biometrics has been limited by the conditions imposed by the requirement that high resolution, high contrast images of the iris be obtained. Conventionally, this requirement has only been met reliably by the careful positioning of a single, cooperative, stationary subject within the limited field of view of a suitable illumination and image capture device. Typical existing systems limit this capture volume to a small region of space within a few 10's of centimeters of the sensor. For example, the LG3000 system manufactured by LG Electronics requires a subject to remain stationary for 3-10 seconds at standoff distance of roughly 10 cm and provides a capture volume of roughly 10×2×2 cm or 0.04 liters. These limitations are workable in constrained settings such as security checkpoints, bank teller machines, or information system access points, but severely limit the applicability of iris biometrics in minimally constrained settings, such as screening in airports, subway systems, or at entrances to otherwise uncontrolled buildings or facilities.

Therefore, there is a need in the art for a method and apparatus for obtaining iris-based biometric information from a moving subject.

SUMMARY OF THE DISCLOSURE

The deficiencies of the prior art are addressed by various exemplary embodiments of the present invention of a method and apparatus for obtaining iris-based biometric information from a moving subject. A method and apparatus for obtaining iris biometric information that provides increased standoff distance and capture volume is provided herein. In one embodiment, a system for obtaining iris biometric information includes an array of cameras defining an image capture volume for capturing an image of an iris; and an image processor, coupled to the array of cameras, for determining at least one suitable iris image for processing from the images generated for the image capture volume. The image capture volume may include a plurality of cells, wherein each cell corresponds to at least one of the cameras in the array of iris image capture cameras. A subject within the capture volume is repeatedly imaged to produce a plurality of images of the subject. The plurality of images are processed to extract at least one clear image of the subject's iris. The clear image is then processed to, for example, identify the subject.

BRIEF DESCRIPTION OF THE DRAWINGS

The teachings of the present invention can be readily understood by considering the following detailed description in conjunction with the accompanying drawings, in which.

Where possible, identical reference numerals have been used to designate identical elements that are common to the figures in order to facilitate understanding.

DETAILED DESCRIPTION

The invention will be primarily described within the general context of exemplary embodiment of the present invention of a method and apparatus for obtaining iris biometric information from a moving subject.

The present invention provides iris biometric identification systems having fewer constraints on subjects than traditional systems. For example, the subject to be identified may be in motion (e.g., walking) and may not be actively involved in the identification process. The reduction in constraints is accomplished, at least in part, by providing a method and apparatus that extends the standoff distance and capture volume of the system. The standoff distance is the distance between the image acquisition system and the subject. In some cases, there may be two standoff distances, the camera-subject distance and illumination-subject distance. The capture volume is a volume in four dimensions (i.e., space and time) within which an iris image can be captured with high probability that it will generate an acceptable iris template for iris image processing.

Figure 1:
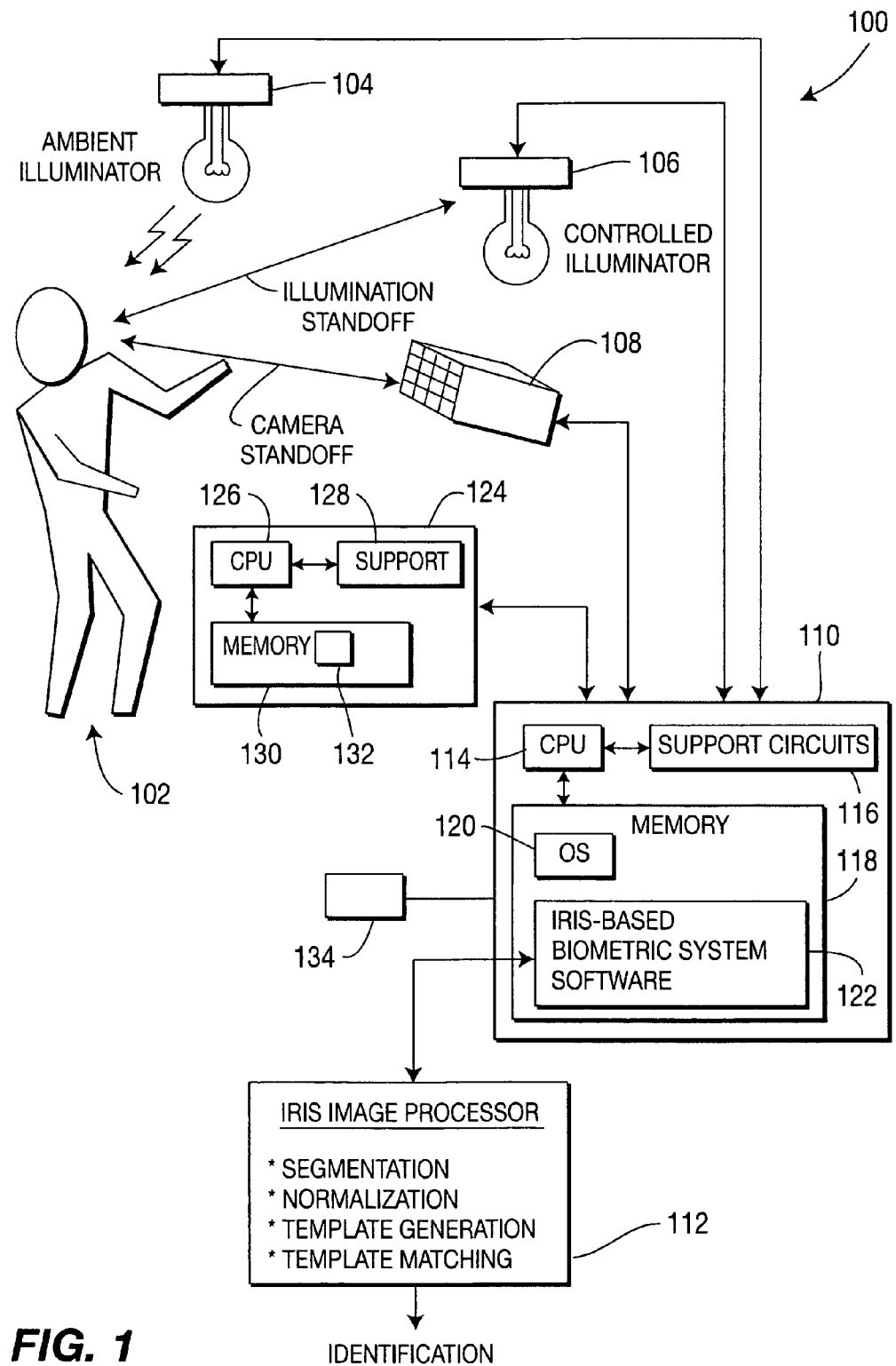
FIG. 1 depicts a block diagram of one embodiment of an iris-based biometric system of the present invention.

FIG. 1 depicts an exemplary iris biometric identification system 100 of the present invention. The system 100 generally comprises a trigger sensor 134, a controlled illuminator 106, an illumination controller 124, a camera array 108, and an image processor 110. An ambient illuminator 104 is generally present due to ambient room or sun light. System designers may control the ambient light through selection and placement of one or more ambient illuminators, e.g., ceiling lights. However, in many instances the ambient illumination is not controlled by the system designers such that the controlled illumination is adjusted in response to the ambient light proximate the system 100. The trigger sensor 134 may be any sensor suitable for detecting the presence of a subject 102 entering a predetermined region, such as a motion detector, infrared detector, pressure sensor, photo-optic switch, and the like. The subject 102, upon entering the predetermined region and being detected by the trigger sensor 134, is illuminated by both ambient illumination and controlled illumination. Once the subject 102 is illuminated, the camera array 108 captures one or more images of the subject's iris, and the image processor 110 processes the images to identify the subject 102 as described below.

The controlled illuminator 106 and, optionally, the ambient illuminator 104 are controlled by the illumination controller 124. One exemplary embodiment of the illumination controller 124 is an illumination controller for light-emitting diode (LED)/laser diode arrays that can generate strobed illumination that is synchronized with the image capture performed by the camera array. The duration, intensity and position of the illumination sources (strobes) with respect to the start of video frames are adjustable to optimize performance for specific applications. The light intensity is increased during the strobe period so that an adequate signal-to-noise ratio (S/N) may be maintained, while the average irradiance remains below threshold limit values for safe exposure of the subject.

In operation, the illumination controller 124 provides synchronization to or accepts synchronization from the camera array 108 such that the illumination controller 124 generates control signals for the controlled illuminator 106 that are synchronized to the camera array 108. The controlled illuminator 106 irradiates an object, for example, subject 102 and photons reflected from the subject 102 are captured by the camera array 108. The subject 102 may be disposed at a large stand-off distance from the camera/source combination. In one specific embodiment, the subject 102 is between about 2-3 meters from the camera and about 1-2 meters from the source. In another specific embodiment, the subject 102 is about 0.5 meters from the camera and about 0.5 meters from the source.

Either the camera array 108 or the illumination controller 124 may be a source of timing signals, i.e., a timekeeper. The camera array 108 may provide synchronization signals to the controller 108 or the controller 108 may provide synchronization to the camera array 108. A variety of cameras may be used within the camera array 108. Some standard, analog cameras, such as RS-170 (EIA-170, Electronics Industry Alliance, Arlington, Va.), have no provision for input of an external synchronization signal. For these cameras, the illumination controller 124 must accept the RS-170 signal as an input and derive synchronization signals from that signal. Other cameras, particularly digital cameras using a camera link interface, can accept a trigger signal either directly or through a digital frame grabber card in a computer that is controlling the system. Examples of equipment suitable for use in the camera array 108 include the Pulnix TM4100CL camera and the Matrox Helios eCL/XCL frame grabber board respectively.

Use of a microcontroller-based illumination controller 124 facilitates the ability of the system to handle a variety of cameras. As such, in one embodiment, the illumination controller 124 may comprise a microcontroller 126, support circuits 128 and memory 130. The microcontroller may be any one of the many microcontrollers available including, for example, a ZWorld RCM 2100. The support circuits 128 comprise well known support circuits such as power supplies, clock circuits, registers, buffers, and the like. In addition, the support circuits may contain circuits for facilitating conversion of video signals into synchronization signals such as sync strippers, signal buffers, frame grabbers, and the like. In one embodiment, a video signal is provided to enable the controller 108 to produce synchronization signals directly from the video images. The memory 130 may comprise random access memory, read only memory or any combination thereof. The memory 130 stores instruction (control software 132) for the microcontroller that facilitates creation of the synchronization signals. Further examples of methods and apparatus for synchronizing the controlled illuminator 106 and the camera array 108 are disclosed in the previously incorporated U.S. patent application Ser. No. 11/334,968.

The illumination levels received at the subject 102 from all sources of illumination must meet specific safety levels to avoid damage to the retina of the subject, yet provide sufficient illumination for the iris image to be processed. Thus, a safety assessment is performed that accounts for scenario constraints (e.g., camera and illuminator position), standoff distances, ambient illumination, maximum level of illumination from the controlled illuminator and so on. Examples of a method and apparatus for designing an iris biometric identification system suitable for determining portions of the present invention for various scenario constraints are described in previously incorporated U.S. patent application having Ser. No. 11/364,300.

The camera array 108 comprises an array of cameras configured to capture a number of images within a predetermined volume. In one embodiment, the camera array 108 comprises an array of narrow-field-of-view (NFOV) cameras. The array of NFOV cameras may comprise fixed and/or pan-tilt-zoom cameras. However, in a typical embodiment, the cameras are fixed in position and focal length, and enough cameras are used to produce a sufficient image capture volume to image a subject.

To reliably match and identify an iris pattern, a picture of an iris typically should be at least 100 pixels in diameter. With average diameter of an iris about 1.0 cm, a conventional camera with 512×512 resolution can only cover a spatial area of 3.0×3.0 cm². To maximize the probability of obtaining an iris image suitable for identifying a subject 102, the camera array 108 may be configured to define an image capture volume within which images of subjects are most likely to result in iris images suitable for iris biometric identification. For example, a suitable image capture volume may be designed to obtain iris images of subjects having varying heights, head positions, apparel, and the like, or to compensate for physical obstructions that may be present in the region where the iris biometric identification system 100 is located.

Figure 2:
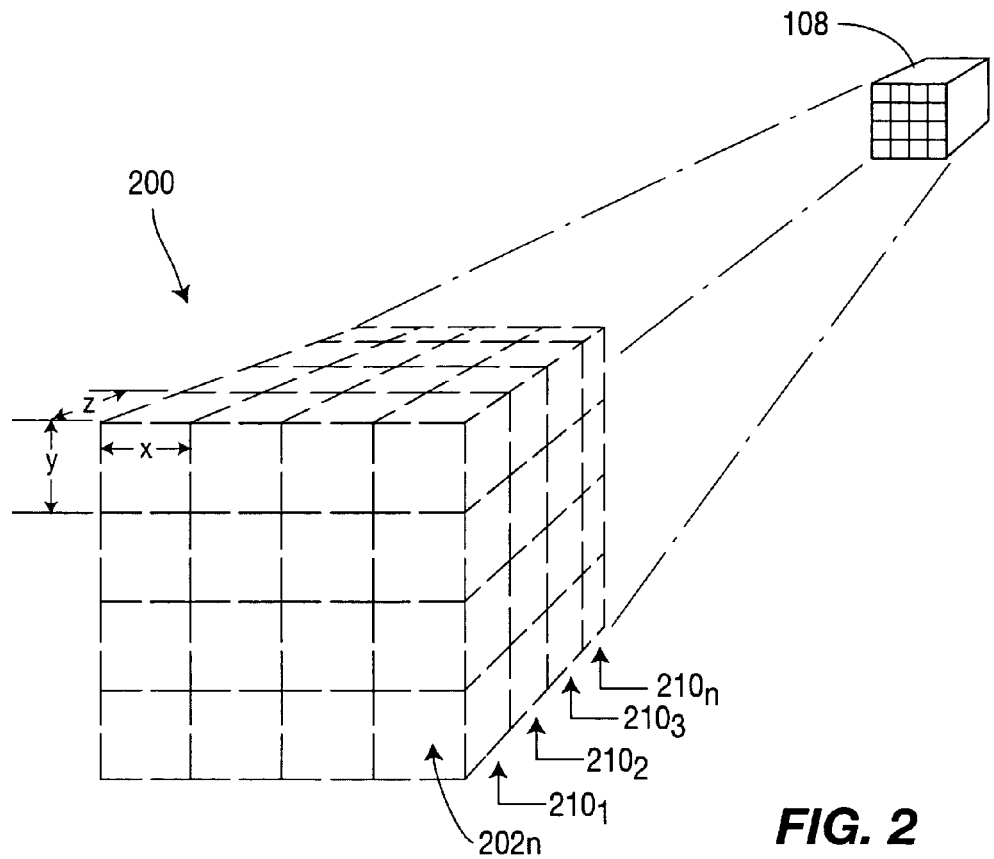
FIG. 2 depicts one embodiment of an image capture volume of the system of FIG. 1.

In one embodiment, depicted in FIG. 2, an image capture volume 200 is defined by the combination and configuration of the depth-of-field parameters for each camera in the camera array 108. The image capture volume 200 comprises a number of cells $202_n$ that are arranged to form a desired capture volume of interest. Each cell $202_n$ corresponds to a given camera within the camera array 108 and typically has a volume defined by the parameters of the corresponding camera (e.g., resolution and depth-of-field). In the embodiment depicted in FIG. 2, each cell $202_n$ has an x, y, and z dimension (illustratively using a Cartesian coordinate system). Although the x, y, and z dimensions of the cells depicted in FIG. 2 are shown to be approximately equal, it is contemplated that the cells may have other configurations (in the same or alternate coordinate systems) depending upon the focal parameters of the cameras utilized in the camera array 108. In addition, each cell $202_n$ does not have to have the same dimensions as any of the other cells within the image capture volume 200.

In one exemplary embodiment, there are 3 cameras in the array 108. Each camera defines a cell of 30 cm by 30 cm by 5 cm Thus a capture volume of 90 cm by 30 cm by 5 cm is defined. Of course, by altering the number of cameras, adding additional arrays, and the like, the capture volume may be altered to compliment any environment.

In the embodiment depicted in FIG. 2, the cells are immediately adjacent one another and form a cube. Alternatively, the cells may overlap neighboring cells or may be spaced apart a given distance. In addition, although the image capture volume 200 is depicted as a cube in FIG. 2, the cells may alternatively be arranged continuously or discontinuously to form any volume (in any geometric or random shape) as desired to capture iris images of subjects within a given system.

Each of the images obtained from the cells in the image capture volume 200 are coupled to the image processor 110 to identify the subject(s) within the image capture volume 200. Thus, using the embodiment above, 3 images from 3 cameras are simultaneously created and coupled to the image processor 110. In performing the iris identification procedure, as described below, the image processor 110 may scan through each image individually to obtain a suitable iris image for identifying the subject, i.e., an iris image that is in-focus. Since the camera array 108 defines a continuous volume that repeatedly generates images at video rates, i.e., 3 images from the volume every $1/30^{th}$ of a second, a subject may blink, turn their head, and the like, yet there is a high probability that at least one iris image taken in the capture volume will be suitable for identification processing. The number of useful images, N, that can be acquired by a camera of frame rate, f, as a subject walks through a capture volume of depth, D, at a speed, V, may be estimated from the equation N=fD/V. In one exemplary embodiment, taking 10 cm as the depth of field, 15 frames per second and 1 meter/second as the speed of a subject, the system captures 1.5 images. Thus, at least one in focus image will be captured as the subject walks through the system. If, for some reason a suitable image is not created, other security measures may be invoked. To process all the images, each of the obtained images is coupled directly to the image processor 110. Furthermore, the volume facilitates simultaneous imaging of multiple subjects as they pass through the volume. The images may be buffered prior to processing to facilitate the bandwidth and/or feed rate of the images at all points between the camera array 108 and the image processor 110. The buffered images are ultimately received by the image processor 110, which may then process the images as discussed below.

Alternatively, each cell $202_n$ within a given xy plane may be grouped together by the system to form an image curtain $210_{1-n}$. The image curtains $210_{1-n}$ may be orthogonal to the camera array 108, as depicted in FIG. 2, or may be on some other configuration. In this manner, at any one time only one plane of images is being produced. Thus, in an embodiment 3 cells wide by 3 cells high by 3 cells deep, for a volume of 9 cells, 3 cells in a plane simultaneously produce 3 images. These images are processed by the image processor 110. Then, the next curtain of 3 images is created and processed and so on. By processing the volume of images in curtains, any limitations on the bandwidth or number of camera connections to the image processor 110 can be accommodated.

Optionally, the image curtains $210_{1-n}$ may be additionally be used to reduce the processing time required to find a satisfactory iris image by quickly scanning through the image curtains to determine where an in-focus image of an iris is expected and then processing only the images within a particular image curtain $210_n$ or range of image curtains to obtain the iris image. Optionally, a sensor (not shown) may be utilized to assist in determining the distance of the subject from the camera array 108, and therefore, which image curtain a likely satisfactory iris image may be found.

Alternative configurations for the camera array 108 and of methods for processing iris images suitable for use with the present invention are described in U.S. patent application Ser. No. 10/939,943, filed Sep. 7, 2004 by Hanna, et al., entitled "Method and Apparatus for Performing Iris Recognition from an Image", which is incorporated herein by reference.

The image processor 110 is coupled to at least the trigger sensor 134, the video camera array 108 and the controlled illuminator 106 (via the illumination controller 124). Optionally, the image processor 110 may also be coupled to the ambient illuminator 104. The image processor 110 may be a general purpose computer that, when executing certain software, becomes a specific purpose computer that performs the present invention. The image processor 110 comprises at least one central processing unit (CPU) 114, support circuits 116, and memory 118. The CPU 114 may be any one of the many microprocessors that are commercially available. The support circuits 116 comprise circuits that facilitate operation of the CPU 114 including clock circuits, cache, power supplies, input/output circuits and the like. The memory 118 may comprise one or more of read only memory, random access memory, disk drives, optical memory, removable memory and the like. The memory 118 stores an operating system 120 and an iris-based biometric system software 122. When the software 122 is executed, the computer analyzes captured iris image information, for example, to identify a subject. An iris model database for use in the matching process may be stored in the memory 118 or otherwise connected to the image processor 110. The iris model database contains iris images or extracted pattern features used for iris pattern matching with the obtained iris images.

The image processing software 122 may analyze the imagery using iris recognition techniques (such as iris recognition algorithms as taught by Daugman; see, e.g., U.S. Pat. No. 5,291,560), pupillometry techniques, saccade motion analysis techniques, and other techniques now known or future developed. For example, in the embodiment depicted in FIG. 1, the software 122 includes code for performing exemplary steps 112 for iris identification—segmentation and normalization of the iris images, generation of an iris template, and matching of the generated iris template to a database of templates to identify the subject. Further examples of methods of analyzing an iris image suitable for use with the present invention are disclosed in the previously incorporated U.S. patent application Ser. No. 11/334,968.

Although the illumination controller 124 is depicted separately from the image processor 110, in another embodiment of the invention, the image processor 110 may perform the functions of the illumination controller microcontroller 126. Alternatively, the illumination controller may be a circuit card within the image processor 110.

Figure 3:
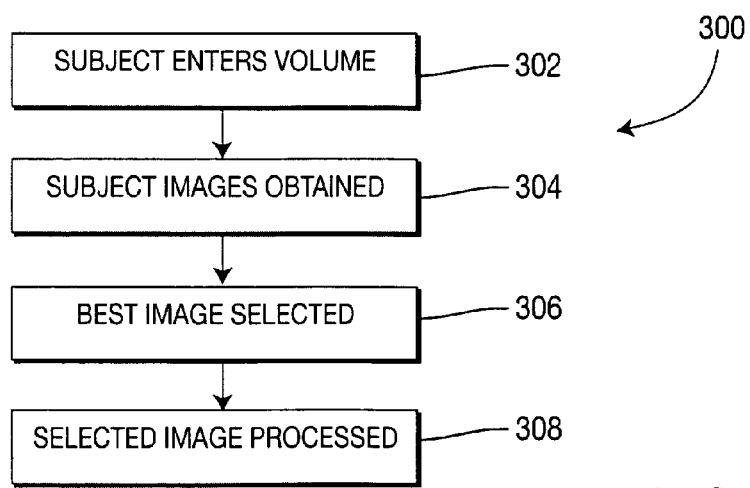
FIG. 3 depicts one embodiment of a method of obtaining iris-based biometric information of the present invention.

FIG. 3 depicts a flow diagram of one embodiment of a method 300 of obtaining iris image biometric information. The method 300 is described with reference to both FIG. 1 and FIG. 2, above. The method 300 begins at step 302 when a subject 102 enters the image capture volume 200. The subject 102 may be detected by the trigger sensor 134, which alerts the image processor 110 to begin obtaining images. Multiple subjects may be simultaneously imaged. Since the invention is producing imagery from the entire capture volume, any number of subjects may be in the volume. Consequently, the invention processes all the images to determine multiple iris images for processing.

Next at step 304, images of the subject 102 are obtained by the camera array 108 as the subject proceeds through the image capture volume 200, as described above. The images are coupled to the image processor 110, where the iris-based biometric system software 122 analyzes the images to select the best quality iris images (of one or more subjects). The best quality iris image of any one subject may be a single image, or may be a mosaic, or collage, of multiple images that are processed to obtain a single, high-quality iris image to use as an iris template for a particular subject.

Next, at step 308, each of the selected iris images is processed and compared to a database of iris information to attempt to match the subject iris with an individual contained in the iris image database. There are various outcomes for attempting to perform iris recognition. For example, the system may fail to recognize that a subject is within the capture volume, fail to acquire an iris template from a subject known to be within the capture volume, fail to recognize an acquired iris template, match an iris template against a watchlist, match an iris template against some other database (e.g., authorized users, passenger manifest, employee database), recognize some feature of an acquired template or iris image that triggers an alarm (e.g., an attempt to spoof the system, or a subject moving counter to expected flow for that type of subject, or a false match against a database). Exemplary embodiments of systems for performing iris recognition can be designed to respond differently to the outcome depending on the particular scenario and the needs and desires of the system user. Some exemplary responses to failure to acquire an iris template from someone known to be in the capture volume include sounding an alarm, signaling a person, and collecting the failure as a statistic to measure system performance.

Thus, a method and apparatus for obtaining iris biometric information of a moving subject has been described in which the ability to capture satisfactory iris images is increased by the extending the standoff distance and capture volume of the iris detection system.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A system for obtaining iris biometric information, comprising:
    an array of cameras defining an image capture volume for capturing a plurality of images of an iris;
    a trigger sensor for sensing the presence of a subject entering or about to enter the image capture volume, the trigger sensor being separate and distinct from the array of cameras; and
    an image processor, coupled to the array of cameras, for determining at least one suitable iris image for processing from the images generated from the plurality of images for the image capture volume, the trigger sensor being coupled to the array of cameras, and configured to trigger the capturing of images when the presence of a subject is sensed; and
    at least one illumination controller for synchronizing with the array of cameras at least one illumination source for illuminating the iris with a plurality of photons;
    wherein a light intensity of the illumination source is increased during a strobe to maintain a predetermined signal-to-noise ratio (S/N), while an average irradiance of the illumination source remains below a safety threshold.

2. The system of claim 1, wherein the image capture volume further comprises a plurality of cells, wherein each cell corresponds to at least one of the cameras in the array of iris image capture cameras.

3. The system of claim 2, wherein each cell corresponds to a single one of the cameras in the array of iris image capture cameras.

4. The system of clan 2, wherein at least a subset of the cells are immediately adjacent one another.

5. The system of claim 2, wherein at least a subset of adjacent cells are spaced apart from one another.

6. The system of claim 2, wherein at least a subset of the cells overlap.

7. The system of claim 2, wherein the cells correspond to the resolution of the cameras in the array of iris image capture cameras.

8. The system of claim 2, wherein the cells correspond to the depth-of-field of the cameras in the array of iris image capture cameras.

9. The system of claim 1, wherein the image processor further comprises:
    a memory containing an iris-based biometric system software that, when executed, analyzes at least one image obtained by the array of iris image capture cameras.

10. The system of claim 1 wherein each camera in the plurality of cameras has a fixed position and focal length.

11. A method for obtaining iris biometric information, comprising:
    defining an image capture volume from an array of cameras;
    sensing with a trigger sensor the presence of a subject entering or about to enter the image capture volume, the trigger sensor being separate and distinct from the cameras;
    obtaining a plurality of images of an iris from the array defining the image capture volume, the obtaining being triggered by the sensing of the presence of the subject by the trigger sensor; and
    processing at least one of the plurality of images with an image processor to determine at least one suitable image within the plurality of images; and
    synchronizing with the array of cameras at least one illumination source for illuminating the iris with a plurality of photons using at least one illumination controller;
    wherein a light intensity of the illumination source is increased during a strobe to maintain a predetermined signal-to-noise ratio (S/N), while an average irradiance of the illumination source remains below a safety threshold.

12. The method of claim 11, wherein the step of defining an image capture volume further comprises:
    defining a plurality of cells that correspond to each camera within the array of iris image capture cameras.

13. The method of claim 12, further comprising aligning the cells such that at least a subset of cells are immediately adjacent to each other.

14. The method of claim 12, further comprising aligning the cells such that at least a subset of adjacent cells are spaced apart from each other.

15. The method of claim 12, further comprising aligning the cells such that at least a subset of cells overlap.

16. The method of claim 11, wherein obtaining iris biometric information further comprises designing a system for obtaining iris biometric information comprising the steps of:

receiving a plurality of design constants for a minimally constrained environment;
calculating at least one calculated parameter; and
providing a design for an iris biometrics system that operates within the plurality of design constraints, the design being based on the at least one calculated parameter.

17. The method of claim 16, wherein the minimally constrained environment comprises at least one of: a security checkpoint, an office, a boarding bridge, a corridor, and an automobile.

* * * * *